United States Patent
Anthony et al.

(10) Patent No.: US 6,731,885 B2
(45) Date of Patent: May 4, 2004

(54) CAPACITIVE PROBE TONER LEVEL DETECTOR ASSEMBLY

(75) Inventors: James D. Anthony, Victor, NY (US); John C. Fournier, Bowmansville, NY (US); Kurt E. Jones, Webster, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/177,654

(22) Filed: Jun. 21, 2002

(65) Prior Publication Data

US 2003/0016957 A1 Jan. 23, 2003

Related U.S. Application Data

(60) Provisional application No. 60/302,182, filed on Jun. 29, 2001.

(51) Int. Cl.[7] ........................ G03G 21/12; G03G 15/10
(52) U.S. Cl. ........................ 399/35; 399/61; 399/360
(58) Field of Search ........................ 399/34, 35, 61, 399/358, 360, 99

(56) References Cited

U.S. PATENT DOCUMENTS

| | | | | |
|---|---|---|---|---|
| 4,711,561 A | * | 12/1987 | Tsuruoka | 399/35 |
| 4,730,205 A | * | 3/1988 | Ogiri et al. | 399/35 |
| 4,761,674 A | * | 8/1988 | Ogura | 399/35 |
| 4,868,599 A | * | 9/1989 | Niki | 399/35 X |
| 5,465,619 A | * | 11/1995 | Sotack et al. | 399/61 X |
| 5,715,512 A | * | 2/1998 | Kumagai | 399/35 X |
| 5,890,049 A | * | 3/1999 | Williams et al. | 399/360 |
| 6,405,016 B1 | * | 6/2002 | Fournier et al. | 399/360 |

* cited by examiner

Primary Examiner—Sandra Brase

(57) ABSTRACT

A toner level detector assembly includes an electrically conductive container body that defines a container cavity and an orifice. A sensor assembly includes a holder and a probe. The holder is sealingly associated with the orifice. The probe is disposed within the holder. The holder electrically isolates the probe from the container body. The probe senses a level of material within the container cavity.

27 Claims, 4 Drawing Sheets

CAPACITIVE PROBE TONER LEVEL DETECTOR ASSEMBLY

CROSS-REFERENCE TO RELATED APPLICATIONS

This application claims the benefit of the priority date of Provisional Patent Application Ser. No. 60/302,182 filed Jun. 29, 2001.

FIELD OF THE INVENTION

The present invention relates generally to an apparatus for the detection of toner levels in an electrophotographic printing machine.

BACKGROUND OF THE INVENTION

Generally, the process of electrophotographic printing and/or copying includes charging a photoconductive surface to a substantially uniform potential or voltage. The charged photoconductive surface is then exposed to record an electrostatic latent image corresponding to an original document to be copied. Thereafter, a developer material is brought into contact with the latent image. The developer material attracts toner particles onto the latent image. The resultant image is then transferred from the charged photoconductive surface onto a copy sheet, to which it is subsequently bonded.

Contaminants, such as paper fragments, developer material, toner and other residue, remain on the photoconductive surface after the image has been transferred to the copy sheet. This residue must be removed from the photoconductive surface prior to the next charging thereof. Typically, a cleaning station is provided within the electrophotographic printing and/or copying machine to remove the residue from the photoconductive surface. The cleaning station generally includes cleaning brushes and a vacuum system. The cleaning brushes dislodge the residue from the photoconductive surface into an air stream created by the vacuum system. The residue is deposited by the air stream into a waste container. The waste container must be emptied when full or nearly full, in order to prevent residual toner particles from being catastrophically distributed throughout the machine. Thus, the level of residual toner within the waste container must be monitored in some way in order to detect when the container is full or nearly full.

One method by which the level of residual toner is conventionally monitored is through the use of an optical monitoring device. Optical devices, however, require frequent cleaning to remove stray contaminants, such as dust and other particles, from the device to ensure proper operation. Further, such optical devices can yield premature or inaccurate indications of a full waste container due to toner dust clinging to the sides of an otherwise empty or only partially full waste container. Such false indications of a full waste container can result in increased machine downtime due to the required operator intervention to clear such a false indication.

Another method by which the level of residual toner is conventionally monitored is through the use of a weighing device which measures the weight of the waste container to thereby indicate when the container is full or nearly full. Such weighing devices require frequent calibration. Furthermore, different types of toner will have different densities. When, for example, a lower density toner is in use, a weight-based monitoring system can result in the waste container being filled with residual toner before the system indicates a full waste container. Such a failure to detect a full waste container results in toner particles being catastrophically distributed throughout the machine, increased machine downtime, and is likely to require a lengthy servicing of the machine.

Yet another method by which the level of residual toner is conventionally monitored is through the use of a capacitive sensor disposed on the outside of and adjacent to the waste container. Such external capacitive sensors are susceptible to electrostatic discharge and other forms of electrical interference which can contribute to an erroneous indication of container status. Further, and similar to optical systems, particles such as stray toner and other particles may become lodged between one or more of the electrodes or plates, and interfere with the operation of the sensor. Moreover, such external capacitive sensors may be bumped and damaged during changing and/or emptying of the waste toner bottle.

Therefore, what is needed in the art is a toner level sensing device that is less affected by stray toner particles and other contaminants.

Furthermore, what is needed in the art is a toner level sensing device that is less sensitive to variations in toner density.

Still further, what is needed in the art is a toner level sensing device that is less susceptible to electrical noise and has a high signal-to-noise ratio.

Moreover, what is needed in the art is a toner level sensing device that is less susceptible to erroneous operation due to electrostatic discharge and other forms of electrical interference.

SUMMARY OF THE INVENTION

The present invention provides an apparatus for detecting the level of material within a container.

The invention comprises, in one form thereof, an electrically conductive container body that defines a container cavity and an orifice. A sensor assembly includes a holder and a probe. The holder is sealingly associated with the orifice. The probe is disposed within the holder. The holder electrically isolates the probe from the container body. The probe senses a level of material within the container cavity.

An advantage of the present invention is that the operation of the toner level detecting assembly is less affected by stray toner particles and other contaminants.

Another advantage of the present invention is that the toner level detecting assembly is less sensitive to variations in toner density.

Yet another advantage of the present invention is that the toner level detecting assembly is less susceptible to electrical noise and has a high signal-to-noise ratio.

A still further advantage of the present invention is that the toner level detecting assembly is less susceptible to erroneous operation due to electrostatic discharge and other forms of electrical interference.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
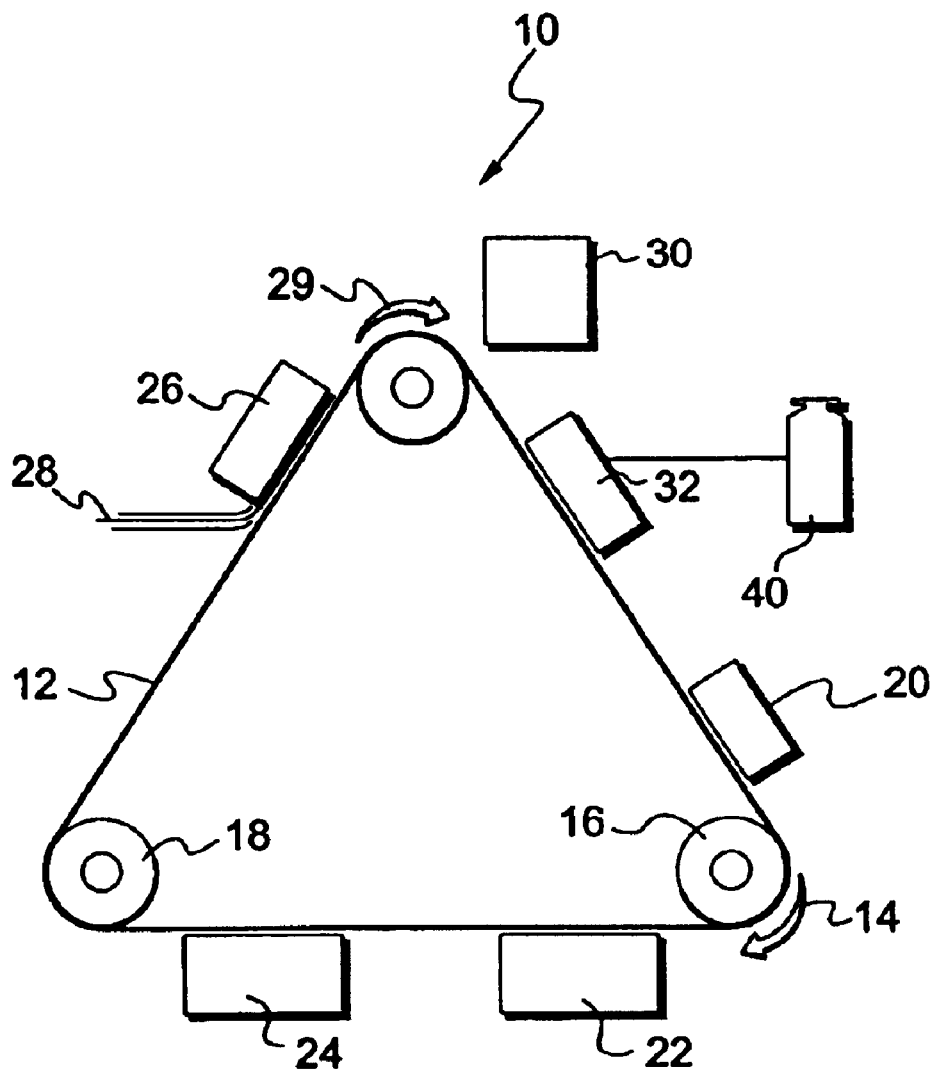
FIG. 1 is a schematic elevational view of portions of an electrophotographic printing machine incorporating one embodiment of a capacitive probe toner level detector assembly of the present invention.

Referring now to the drawings, and particularly to FIG. 1, there is shown an electrophotographic printing and/or copying machine incorporating one embodiment of a capacitive toner level detector of the present invention.

Electrophotographic printer or copying machine 10 generally includes main belt 12 that rotates through the various functional areas or stations of machine 10. Belt 12 is typically constructed of an electrically conductive material, and has a photoconductive surface deposited thereon or otherwise affixed thereto. Belt 12 is driven in the direction of arrow 14 by drive roller 16, which is driven by a motor (not shown), and is tensioned by tensioning roller 18. A portion of belt 12 is first passed through charging station 20, such as a corona generating device, which charges belt 12 to a predetermined electrical potential that is typically negative. Belt 12 is then rotated to exposure station 22, which selectively discharges the photoconductive surface of belt 12 to thereby form an electrostatic latent image that corresponds to an original to be printed or copied.

The latent image now on the surface of belt 12 is rotated to development station 24, wherein toner particles are brought into contact with the latent image by, for example, magnetic brush rollers, to thereby form a toner image on belt 12. Belt 12 is then rotated to place the toner image within transfer station 26, and an image substrate 28, such as a piece of paper or transparency, is brought into contact with the toner image. Transfer station 26 ionizes or otherwise charges, typically through a corona generating device, image substrate 28 and thereby attracts the toner image to image substrate 28. Image substrate 28 is then passed in the direction of arrow 29 to fusing station 30 wherein the toner image is fused, typically by fusing rollers, to image substrate 28. Image substrate 28 is then separated from belt 12 and is guided to a paper tray for removal from machine 10 by an operator.

Belt 12 is then cleaned of residual toner particles at cleaning station 32. Cleaning station 32 typically includes a charging station that charges to a suitable electrical potential and polarity the residual toner particles remaining on the photoconductive surface of belt 12. Cleaning station 32 further typically includes at least one vacuum-assisted electrostatic cleaning brush (not shown). The cleaning brush rotates at relatively high speed to create sufficient mechanical force to remove the residual toner from belt 12. The dislodged residual toner particles are drawn into an air stream created by a vacuum device, also typically included within cleaning station 32, which deposits the residual toner particles into conductive container 40.

Figure 2:
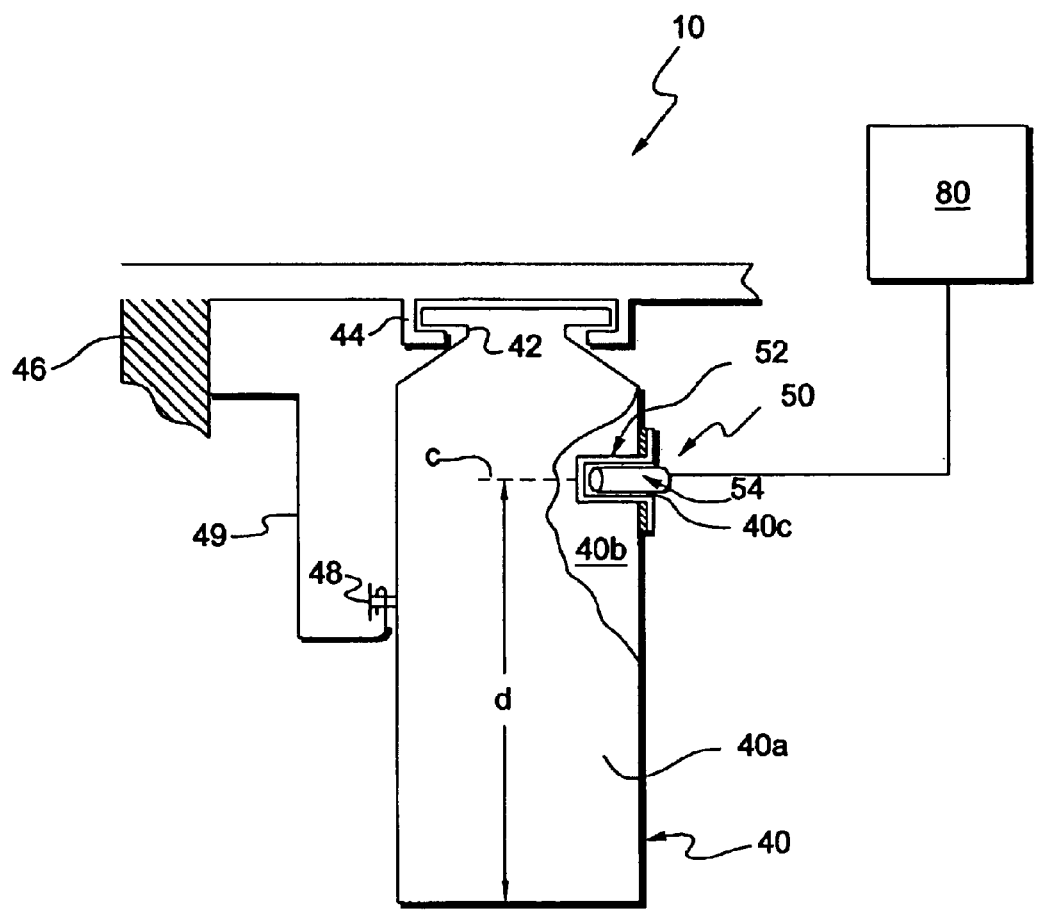
FIG. 2 is a side, partially fragmented and partially sectioned view of the capacitive probe toner level detector assembly of FIG. 1.

Referring now to FIG. 2, conductive container 40 includes container body 40a which defines container cavity 40b and orifice 40c. Conductive container 40 is installed within machine 10 such that the residual toner particles carried by the air stream are deposited in container cavity 40b. More particularly, conductive container 40 is suspended by neck 42 from brackets 44 of machine 10. Brackets 44 are attached to or integral with frame 46 of machine 10. Centerline C of orifice 40c is disposed a predetermined distance d from the bottom (not referenced) of conductive container 40. Conductive container 40 is constructed of an electrically conductive material, such as, for example, aluminum or other suitable material.

Conductive container 40 further includes ground wire attachment 48, such as, for example, a quick connect device or terminal, is affixed to or integral with conductive container 40. A first end of ground wire 49 is received within or otherwise electrically connected to ground wire attachment 48 to thereby electrically interconnect ground wire 48 and conductive container 40. A second end of ground wire 49 is electrically connected, such as, for example, soldered or through an electrical connecter, to frame 46 of machine 10. Frame 46 of machine 10 is held at ground potential. Thus, ground wire 49 electrically interconnects conductive container 40 to frame 46 and thereby holds conductive container 40 at ground potential. Conductive container 40 further includes capacitive probe toner level detector assembly 50.

Figure 3:
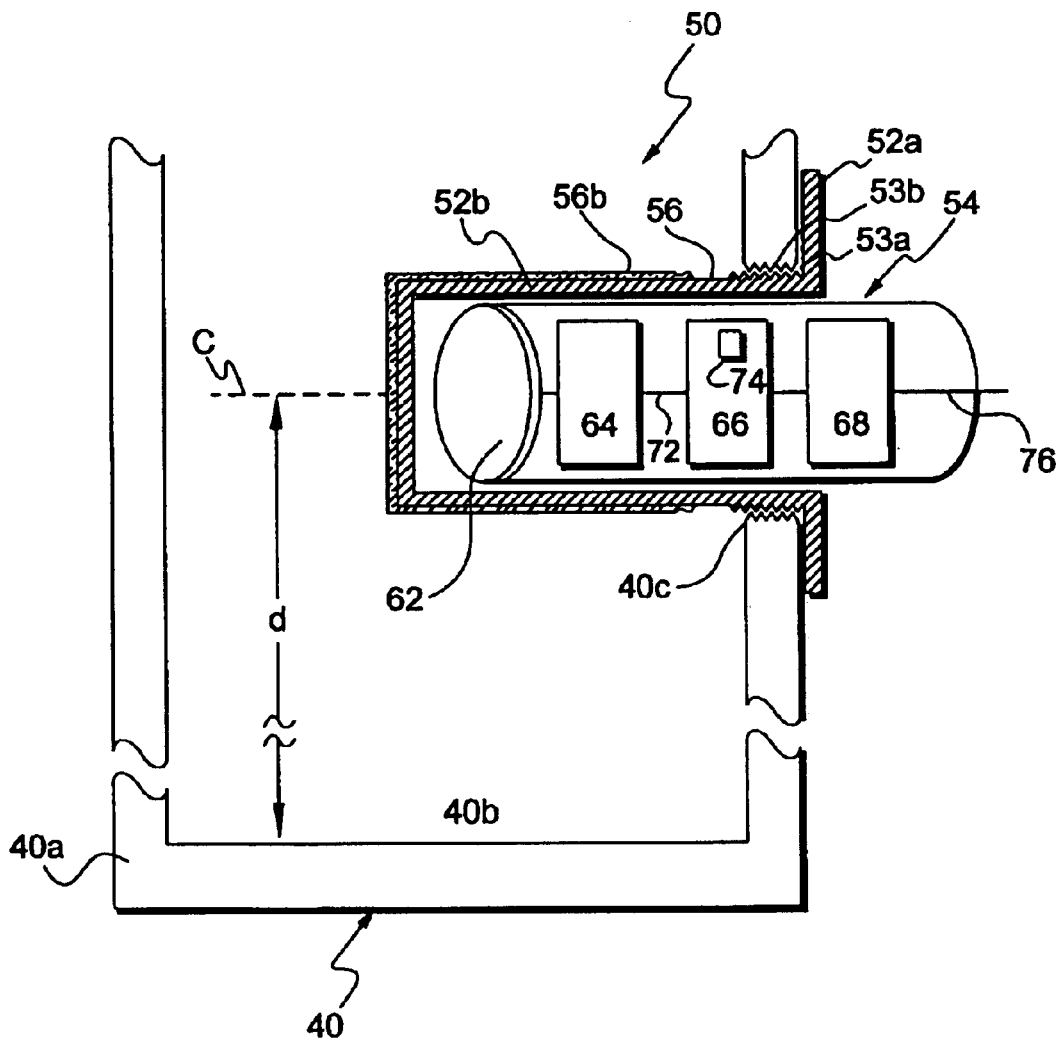
FIG. 3 is a cross-sectional, fragmentary view of the capacitive probe toner level detector assembly of FIG. 1.

Capacitive probe toner level detector assembly 50 includes holder 52 and probe 54. Referring now to FIG. 3, holder 52 includes rim portion 52a and neck portion 52b extending therefrom. Holder 52 is disposed within orifice 40c of conductive container 40 substantially coaxial with centerline C. More particularly, neck portion 52b is inserted into orifice 40c and rim portion 52a is sealingly attached, such as, for example, by threads 53a formed on holder 52 which engage corresponding threads 53b formed on container 40 adjacent orifice 40c, to conductive container 40 to thereby prevent the escape of residual or waste toner particles from cavity 40c of conductive container 40. Holder 52 is constructed of an electrically non-conductive, or isolating, material. Preferably, outer surface 56 of neck portion 52b is coated with non-stick material 56b, such as, for example, polytetrofluroethylene or other suitable non-stick material/coating. Holder 52 is sized to receive probe 54.

Probe 54 includes metal plate 62, oscillator 64, comparator 66, and output circuitry 68 integrated into a convenient package. Generally, probe 54 senses the level of waste toner particles contained within conductive container 40. A commercially available probe, such as, for example, probe model number CJ10-30GK-A manufactured by Pepperl & Fuchs located in Twinsburg, Ohio, provides the functions and circuitry of probe 54, as described herein, in a convenient and integrated package.

Metal plate 62 is disposed on the inner end of holder 52 relative to container 40. Metal plate 62 is electrically connected to oscillator 64. Oscillator 64 senses a change in capacitance and produces sensing signal 72 that is dependent at least in part upon the proximity of conductive particles to metal plate 62. For example, the amplitude of sensing signal 72 increases as toner particles accumulate within conductive container 40 and approach the position or height of metal plate 62 of probe 54. Thus, metal plate 62 acts as a first capacitive plate and the conductive or toner particles act as a second capacitive plate, thereby forming a capacitive sensor with a value of capacitance that varies with the proximity of conductive or toner particles to metal plate 62.

Comparator 66 includes a voltage source 74 that supplies a predetermined threshold voltage 74. Comparator 66 compares the amplitude of sensing signal 72 with threshold voltage 74 in order to determine whether the level of waste toner particles within conductive container 40 is at a predetermined maximum level at which the capacity of waste container 40 is considered to be sufficiently full or utilized. Predetermined threshold voltage 74 is thus determined, at least in part, by the amplitude of sensing signal 72 when the level or amount of waste toner particles contained within conductive container 40 is at or approximately at the predetermined maximum level or the capacity thereof is sufficiently full/utilized. Comparator 66 is electrically connected to output circuitry 68.

Output circuitry 68 issues full signal 76, such as, for example, a direct current electrical signal/voltage having a predetermined voltage level, when sensing signal 72 equals or exceeds threshold voltage 74. Output circuitry 68, and thus full signal 76, is electrically connected to logic control unit 80 (FIG. 2) of printing machine 10. Logic control unit 80, such as, for example, a microprocessor, reads full signal 76 and, in turn, issues a full indication, such as, for example, a "toner waste bottle is full" message and/or suspends operation of printing machine 10 until conductive container 40 is emptied of waste toner particles.

Figure 4:
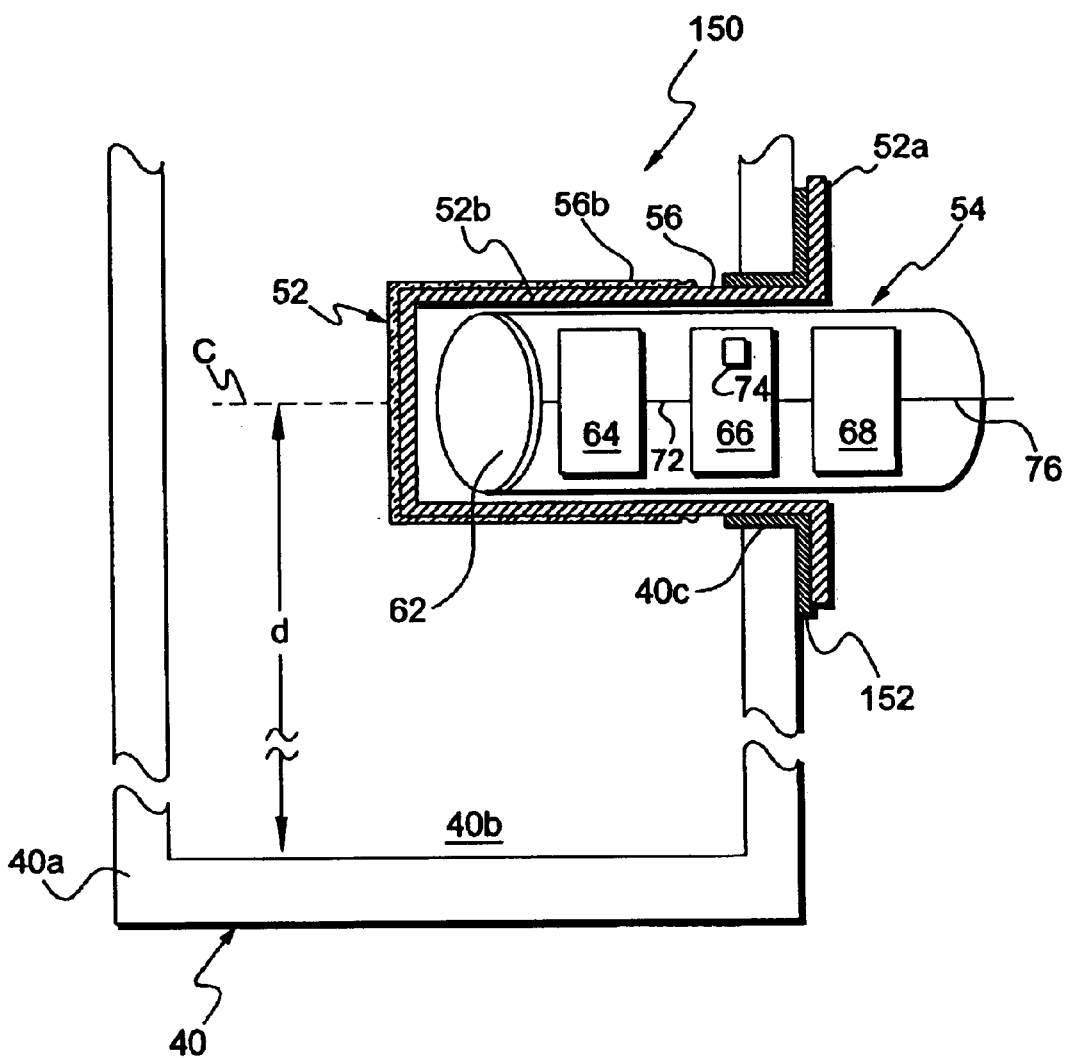
FIG. 4 is a cross-sectional, fragmentary view of a second embodiment of a capacitive probe toner level detector assembly of the present invention.

Referring now to FIG. 4, a second embodiment of a capacitive probe toner level detector assembly of the present invention is shown. Capacitive probe toner level detector assembly 150 is substantially similar to capacitive probe toner level detector assembly 50, and therefore only the distinguishing features thereof are discussed in detail hereinafter. Capacitive probe toner level detector assembly 150 includes sealing member 152. Sealing member 152 is an elastically-deformable member, such as, for example, a rubber gasket or seal. Sealing member 152 sealingly engages outer surface 56 and the inside surface (not referenced) of rim portion 52a of holder 52. Holder 52 is received within orifice 40c such that sealing member 152 sealingly engages orifice 40c to prevent the escape of toner particles from container 40. Sealing member 152 is associated, such as, for example, elastically retained upon or adhesively affixed to, holder 52. Holder 52, carrying sealing member 152, is then affixed, such as, for example, with adhesive, to container 40 in disposition within orifice 40c thereof.

In use, and as stated above, residual and waste toner particles are dislodged from belt 12 and deposited into conductive container 40 by cleaning station 32. This process continues until the level of waste toner particles contained within conductive container 40 reaches approximately the predetermined depth d, i.e., the level at which probe 54 is disposed. The toner particles proximate to holder 52 and plate 62 changes the amount of capacitance sensed by oscillator 64, which, in turn, increases the amplitude of sensing signal 72 to a point in excess of threshold voltage 74. Output circuitry 68 of probe 54 issues full signal 76, which is received by logic control unit 80. Logic control unit 80 reads full signal 76 and, in turn, issues a full indication, such as, for example, a "toner waste bottle is full" message and/or suspends operation of printing machine 10 until conductive container 40 is emptied of waste toner particles.

In conventional nonconductive toner waste containers, toner particles tend to cling to and accumulate first upon the sides of the container due to electrostatic forces. Such a condition can result in a premature indication that the nonconductive container is full due to the sides of the container being completely covered with toner particles. Due to the tendency of the toner particles to cling to accumulate first upon the sides of the container, a large area or volume in the middle portion of the container is often virtually empty and the full capacity of the nonconductive container is not utilized. In contrast, conductive container 40 is held at ground potential by ground wire 49. As particles of waste toner drop into conductive container 40 and accumulate therein, any electrostatic charge on conductive container 40 and/or the toner particles is dissipated by virtue of conductive container 40 being held at ground potential. The toner particles are therefore less likely to cling to and accumulate on the sides of conductive container 40 due to electrostatic force. Thus, the toner particles are more likely to settle into and utilize the entire volume of conductive container 40, and the likelihood of a premature indication of a full condition of conductive container 40 is thereby reduced.

Any electrostatic charges that would build up on an otherwise nonconductive waste container are dissipated by virtue of conductive container 40 being constructed of an electrically conductive material and being held at ground potential via ground wire 49. Since any electrostatic charge on conductive container 40 is dissipated, probe sensor assembly 50 is less susceptible to electrostatic charge of conductive container 40. Furthermore, the grounding of conductive container 40 reduces the susceptibility of probe sensor assembly 50 to various other forms of electrical interference, such as random electrostatic discharges which occur in the electrically noisy environment of machine 10. Moreover, the positioning of probe sensor assembly 50 within electrically-isolating holder 52 reduces the exposure of probe sensor assembly 50 to electrostatic discharges and other forms of electrical interference. Thus, an erroneous indication of a full, or a faulty indication of an empty, conductive container 40 is less likely to occur.

Holder 52 is covered with or constructed of a non-stick material 56b. Non-stick coating 56b inhibits toner particles that enter and accumulate within conductive container 40 from adhering to outside surface 56 of holder 52. Toner particles which would otherwise adhere to outside surface 56 affect, i.e., may affect the operation of probe 54 and can lead to an erroneous full bottle indication. Thus, non-stick coating 56b of outside surface 56 of holder 52, by making toner particles less likely to adhere thereto, reduces the likelihood that probe sensor assembly 50 will yield false bottle full indications.

In the embodiment shown, container 40 includes ground wire attachment 49 disposed on the exterior of the container. However, it is to be understood that the container of the present invention can be alternately configured, such as, for example, with a ground wire attachment disposed on the inside of the container.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A toner level detector assembly, comprising:
an electrically conductive container body, said container body defining a container cavity, said container body further defining an orifice; and
a sensor assembly including a holder and a probe, said holder sealingly associated with said orifice, said probe disposed within said holder, said holder electrically isolating said probe from said container body, said probe sensing a level of material within said container cavity.

2. The toner level detector assembly of claim 1, wherein said probe comprises a capacitive sensor.

3. The toner level detector assembly of claim 1, wherein said holder is one of threadingly and adhesively attached to said container body.

4. The toner level detector assembly of claim 1, said holder further comprising a neck portion having an outside surface, at least a portion of said outside surface being disposed within said container cavity.

5. The toner level detector assembly of claim 4, further comprising a non-stick coating disposed on at least said portion of said outside surface.

6. The toner level detector assembly of claim 5, wherein said non-stick coating comprises polytetrafluoroethylene.

7. The toner level detector assembly of claim 4, wherein said holder is disposed at a predetermined depth from a bottom of said container.

8. The toner level detector assembly of claim 1, further comprising a sealing member sealingly engaging said holder and said orifice to thereby seal said holder to said container body.

9. The toner level detector assembly of claim 1, wherein said container further comprises a ground wire attachment means, said ground wire attachment means configured for receiving and retaining a grounding wire to thereby electrically connect said container body to a ground potential.

10. The toner level detector assembly of claim 9, wherein said ground wire attachment means is one of affixed to and integral with said conductive container body.

11. A probe toner level detector assembly for use with a container, said container having a body, said body constructed of an electrically conductive material and defining a container cavity and an orifice, said probe toner level detector assembly comprising:

a holder, said holder constructed of an electrically insulating material, said holder configured for being sealingly associated with said orifice; and a probe disposed within said holder, said probe configured for sensing a level of material within said container cavity.

12. The probe toner level detector assembly of claim 11, wherein said probe comprises a capacitive sensor.

13. The probe toner level detector assembly of claim 11, said holder further comprising a neck portion having an outside surface, at least a portion of said outside surface configured for being disposed within said container cavity.

14. The probe toner level detector assembly of claim 13, further comprising a non-stick coating disposed on at least said portion of said outside surface.

15. The probe toner level detector assembly of claim 14, wherein said non-stick coating comprises polytetrafluoroethylene.

16. The probe toner level detector assembly of claim 11, wherein said holder is disposed at a predetermined depth from a bottom of said container.

17. The container of claim 11, further comprising a sealing member sealingly engaging said holder and configured for sealing said holder to said container body.

18. An electrophotographic printing machine, comprising:

an electrically conductive container body, said container body defining a container cavity, said container body further defining an orifice; and a probe toner level detector assembly including a holder and a probe, said holder sealingly associated with said orifice, said probe disposed within said holder, said holder electrically isolating said probe from said container body, said probe assembly sensing a level of material within said container cavity.

19. The electrophotographic printing machine of claim 18, wherein said probe comprises a capacitive sensor.

20. The electrophotographic printing machine of claim 18, wherein said holder is one of threadingly and adhesively attached to said container body.

21. The electrophotographic printing machine of claim 18, said holder further comprising a neck portion having an outside surface, at least a portion of said outside surface being disposed within said container cavity.

22. The electrophotographic printing machine of claim 21, further comprising a non-stick coating disposed on at least said portion of said outside surface.

23. The electrophotographic printing machine of claim 22, wherein said non-stick coating comprises polytetrafluoroethylene.

24. The electrophotographic printing machine of claim 21, wherein said holder is disposed at a predetermined depth from a bottom of said container.

25. The electrophotographic printing machine of claim 18, further comprising a sealing member sealingly engaging said holder and said orifice to thereby seal said holder to said container body.

26. The electrophotographic printing machine of claim 18, wherein said container further comprises a ground wire attachment means, a ground wire having a first end electrically connected to said ground wire attachment means and a second end electrically connected to a ground potential to thereby electrically connect said container body to ground potential.

27. The electrophotographic printing machine of claim 26, wherein said ground wire attachment means is one of affixed to and integral with said conductive container body.

* * * * *